Dec. 23, 1958 R. ELLIS 2,865,131
FISH HOOKS
Filed Dec. 28, 1956

INVENTOR.
Robert Ellis

United States Patent Office 2,865,131
Patented Dec. 23, 1958

2,865,131

FISH HOOKS

Robert Ellis, Bronx County, N. Y.

Application December 28, 1956, Serial No. 631,272

6 Claims. (Cl. 43—43.16)

This invention relates to fish hooks and the principal object of the invention is the provision of a fish hook which will practically automatically hook the fish as soon as it bites the bait.

Another object of the invention is the provision of a fish hook constructed of flexible spring wire which is pulled out of a slender tube, over which the bait is drawn, by the bite of the fish, thus enabling the natural curvature of the spring wire to assert itself by piercing the fish's jaw and completing a loop around it which also prevents the fish from becoming unhooked.

Other and further objects will appear in the specifications and be specifically pointed out in the appended claims, reference being had to the accompanying drawings exemplifying the invention in which:

Figure 1:
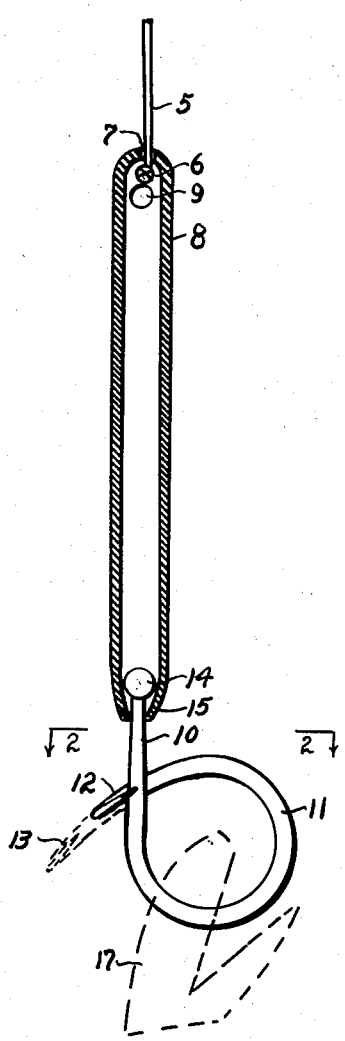
Fig. 1 is a longitudinal cross section of the fish hook in open or extended position.
Figure 3:
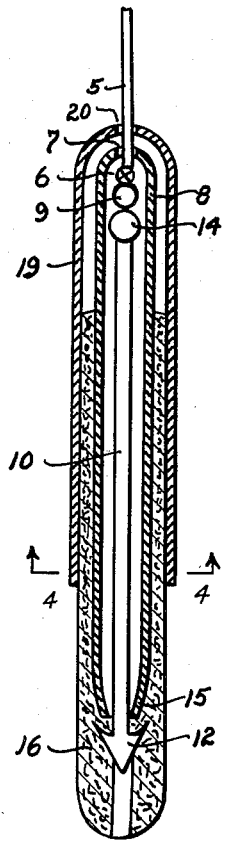
Fig. 3 is a longitudinal cross section of the fish hook while closed or contracted and baited.
Figure 4:
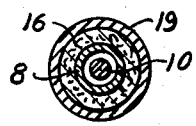
Fig. 4 is a cross section on the line 4—4 of Fig. 3.

Referring to the drawings in which like numerals and characters of reference refer to similar parts throughout the several views, the numeral 5 denotes an ordinary cat-gut line to which the fish hook is customarily attached, it being presumed that this line is invisible to fish. However in this instance the line 5 is first threaded through the small upper hole 7 of the narrow rigid tube 8, which is preferably made of metal or plastic, and then through the larger side hole 9 on the upper side of the tube as illustrated in Figs. 1 and 3. After the line 5 was threaded through both holes 7 and 9, the knot 6 was formed, necessarily on the outside of tube 8. A pull on line 5 will now permit the knot 6 to pass through the larger hole 9 but not through the smaller upper hole 7, thus securing the tube 8 to the line 5.

Figure 2:
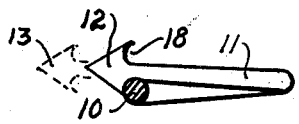
Fig. 2 is a section on the line 2—2 of Fig. 1.

Within the slender tube 8 is slidably located a fine flexible spring wire 10, such as is known to the trade as piano wire (see Fig. 3), which normally has the shape of a loop 11 (see Fig. 1), the barb 12 at the end of the wire 10 extending past the closed circle of the loop to 13, shown by the dotted lines in Figs. 1 and 2. A ball 14 or other enlargement is attached to the top end of the flexible spring wire 10 within the tube 8 and is prevented from being pulled out by the restricted lower part of the tube at 15, which contraction of the tube is fabricated after the ball 14 is inserted therein.

In the art of fishing, the spring wire 10 would first be pushed by the fingers into the tube 8 all the way so that only the barb 12 would be visible at its lower end (see Fig. 3), the bait 16, here shown as a worm, then being slipped over the barb 12 and the slender tube 8, preferably to the top thereof, concealing the tube entirely, the bait 16 only being visible to the fish. As a fish 17 bites onto the lower end of the bait 16, it naturally pulls on the bait and in doing so, the spring wire 10 is pulled out of the tube 8, the spring wire immediately forming into the loop 11, as illustrated in Fig. 1, the barb 12 meanwhile also piercing the mouth of the fish. It will therefore be apparent that the mouth of the fish is not only automatically pierced by the curling up of the spring wire 10 but also securely held within the grip of the loop 11, one of the barbs 12 catching onto the upper end of the wire 10 at the upper end of the loop 11 as soon as any strain is applied thereto and preventing the fish from becoming loose regardless how strenuous the fish may struggle. The barb 12 can be easily released from its hooked position by a pressure of the fingers as will be readily understood, and the fish removed.

In order for the fish not to bite onto the upper end of the bait 16, I provide a transparent tubular shield 19 of glass or plastic, which is passed through the line 5 through the hole 20, the shield 19 completely covering the upper part of the bait 16, making the entire bait visible to the fish yet only permitting the lower end adaptable to seizure by the fish. It will be noted that as soon as the fish bites onto the lower end of the bait and pulls same, the barbs, being imbedded into the bait, will quickly cause the spring wire 10 to be drawn out of the tube 8 resulting in the action previously described.

From the foregoing description it will be apparent that I have evolved a fish hook which will greatly simplify the catching of fish either from a pole or by trolling from a boat, will absolutely conceal the hook by the bait being easily slipped over it in a straight line, will make the bait more attractive to the fish and will automatically catch the fish as soon as it does bite and hold it securely to the hook until released by the fisherman.

Having thus described my invention, I claim:

1. A fish hook comprising a straight rigid tube, means for securing the upper end of said tube to a fish line, and a flexible spring wire slidable for its entire length into and out of said tube from its lower end, said flexible spring wire being normally tensioned to form a closed loop when said wire is pulled out of said tube.

2. A fish hook as in claim 1, and a bulbous enlargement at the upper end of said flexible spring wire cooperating with a restriction on the lower end of said tube to prevent said flexible wire from being wholly extracted from said tube.

3. A fish hook comprising a straight rigid tube, means for removably securing said tube at its upper end to a fish line, a flexible spring wire of approximately the same length of the tube and adapted to slide therein, means for preventing said flexible spring wire from being wholly extracted from said tube, said flexible spring wire being normally tensioned to form slightly more than a closed loop when said spring wire is extended outward from the lower end of said tube.

4. A fish hook comprising a straight rigid tube, means for removably securing said tube at its upper end to a fish line, a flexible spring wire fish hook having a closed loop at its lower end and adapted to slide into the lower end of said tube, said tube being adapted to receive a fish bait completely thereover when said flexible fish hook is fully inserted into said tube.

5. A fish hook as in claim 4, and a transparent tubular cover depending from said fish line and adapted to cover the upper portion of said bait.

6. A fish hook as in claim 3, and a barb at the lower end of said flexible spring wire.

No references cited.